United States Patent [19]
Ando et al.

[11] Patent Number: 5,625,847
[45] Date of Patent: Apr. 29, 1997

[54] HIGH-SPEED ISA BUS CONTROL SYSTEM FOR CHANGING COMMAND CYCLE EXECUTION SPEED BY SELECTIVELY USING ISA BUS CONTROLLER AND HIGH-SPEED BUS CONTROLLER

[75] Inventors: Makoto Ando; Akihito Nagae, both of Tokyo, Japan

[73] Assignee: Kabushiki Kaisha Toshiba, Kawasaki, Japan

[21] Appl. No.: 429,646

[22] Filed: Apr. 27, 1995

[30] Foreign Application Priority Data

Dec. 26, 1994 [JP] Japan ................................ 6-321865
Apr. 17, 1995 [JP] Japan ................................ 7-090903

[51] Int. Cl.$^6$ ........................................ G06F 13/00
[52] U.S. Cl. ............... 395/880; 395/822; 395/823; 395/825; 395/829; 395/858; 395/287
[58] Field of Search ........................... 395/275, 460, 395/281, 880, 822, 823, 825, 829, 858, 287

[56] References Cited

U.S. PATENT DOCUMENTS

| 5,280,587 | 1/1994 | Shimodaira et al. | 395/275 |
| 5,386,517 | 1/1995 | Sheth et al. | 395/275 |
| 5,465,333 | 11/1995 | Olnowich | 395/281 |
| 5,469,555 | 11/1995 | Ghosh et al. | 395/460 |

FOREIGN PATENT DOCUMENTS

| 60-86642 | 5/1985 | Japan . |
| 62-61143 | 3/1987 | Japan . |
| 62-77659 | 4/1987 | Japan . |
| 62-217350 | 9/1987 | Japan . |
| 1-245350 | 9/1989 | Japan . |
| 1-245349 | 9/1989 | Japan . |
| 2-23457 | 1/1990 | Japan . |
| 2-123450 | 5/1990 | Japan . |
| 3-88059 | 4/1991 | Japan . |
| 5-80762 | 4/1993 | Japan . |
| 5-62791 | 9/1993 | Japan . |
| 5-307519 | 11/1993 | Japan . |

*Primary Examiner*—Thomas C. Lee
*Assistant Examiner*—Le Hien Luu
*Attorney, Agent, or Firm*—Oblon, Spivak, McClelland, Maier & Neustadt, P.C.

[57] ABSTRACT

A system controller is provided with an ISA bus controller that executes a command cycle at a speed complying with the standards for ISA buses and a high-speed bus controller that executes a command cycle at a higher speed. When an I/O device that can operate at higher speeds than that of the ISA bus for a PCMCIA controller and IDE interface, a high-speed bus controller is used in place of the ISA bus controller. The high-speed bus controller executes a command cycle at a speed corresponding to the performance of the addressed I/O device. When a busy signal (an inactive IORDY signal) indicating that data transfer is not in time is outputted from the I/O device side, the cycle width of the command is lengthened. There are a synchronous sampling mode and an asynchronous sampling mode for the IORDY signal. The cycle from when IORDY goes off until the command goes off is set in a programmable manner.

12 Claims, 14 Drawing Sheets

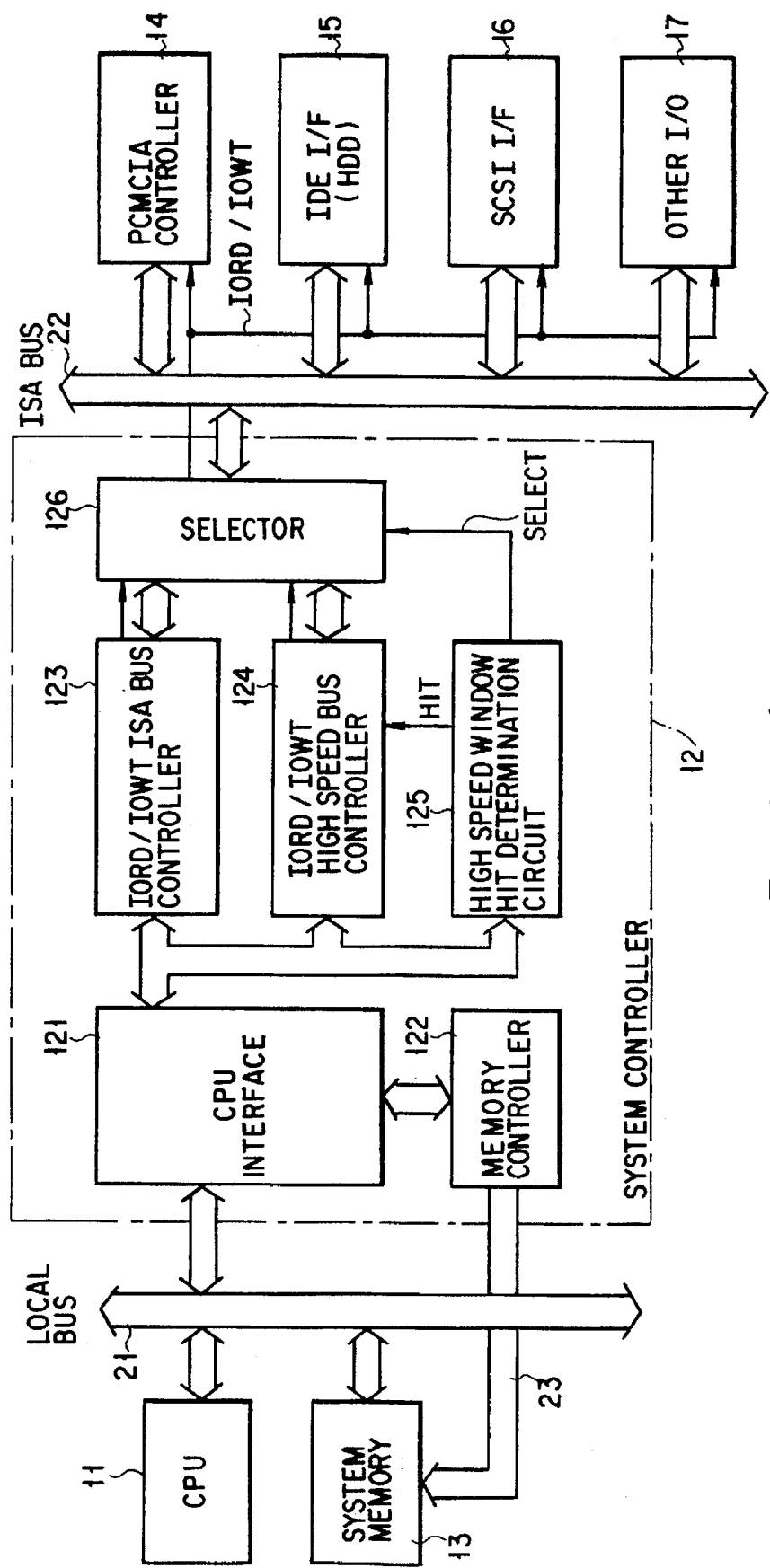
F I G. 1

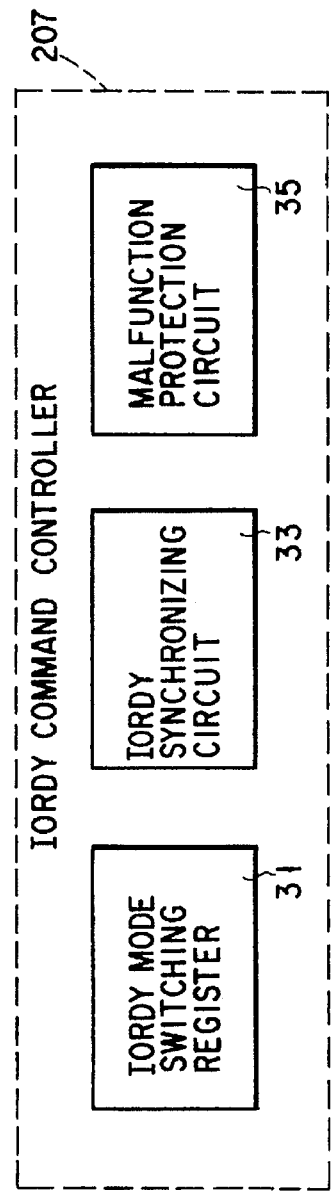
F I G. 5
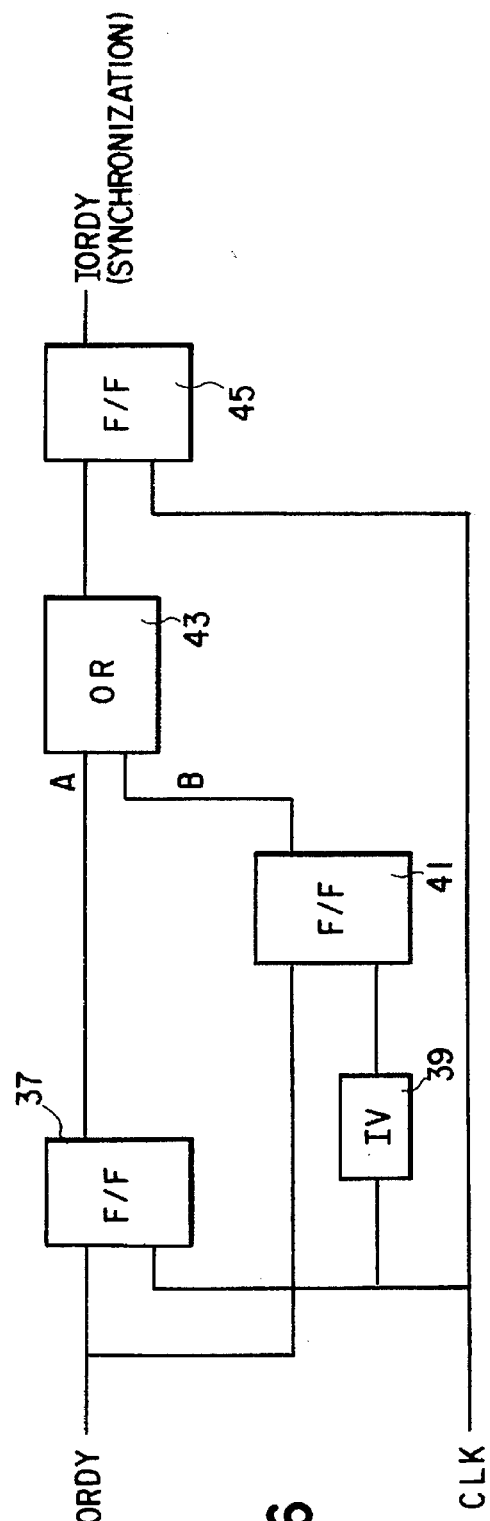
F I G. 6

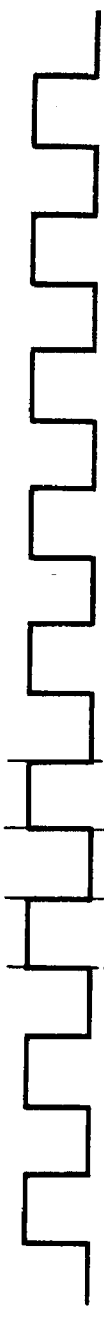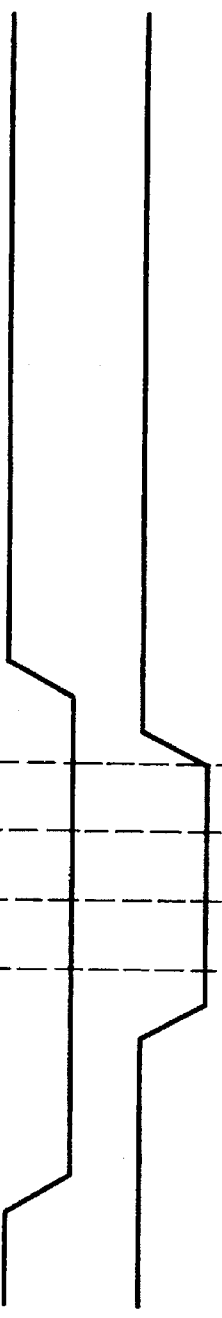
FIG. 7A CLK
FIG. 7B COMMAND
FIG. 7C IORDY
FIG. 7D A
FIG. 7E B
FIG. 7F IORDY (SYNCHRONIZATION)
A CASE WHEREIN IORDY IS SAMPLED AT LEADING EDGE OF CLOCK

FIG. 8A CLK
FIG. 8B COMMAND
FIG. 8C IORDY
FIG. 8D A
FIG. 8E B
FIG. 8F IORDY (SYNCHRONIZATION)
A CASE WHEREIN IORDY IS SAMPLED AT TRAILING EDGE OF CLOCK

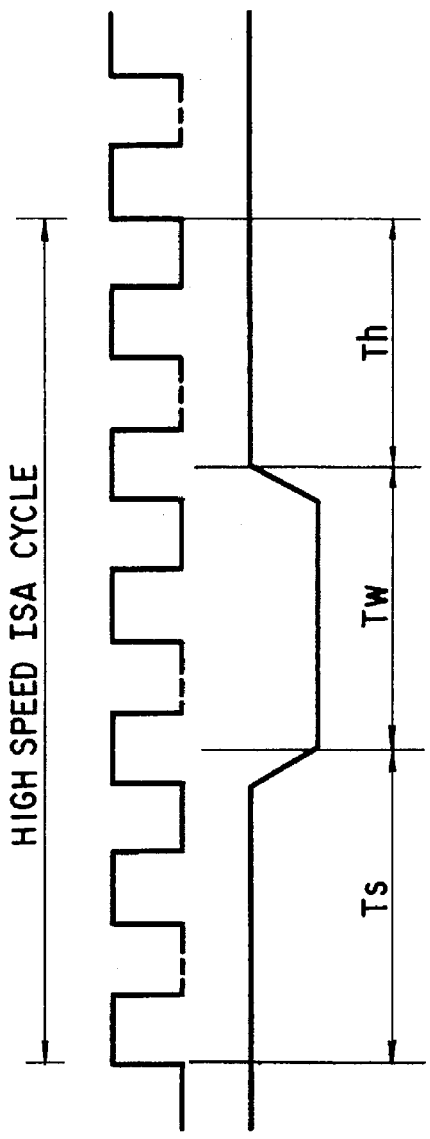
FIG. 12A CPU-CLOCK
FIG. 12B FIORD/FIOWT
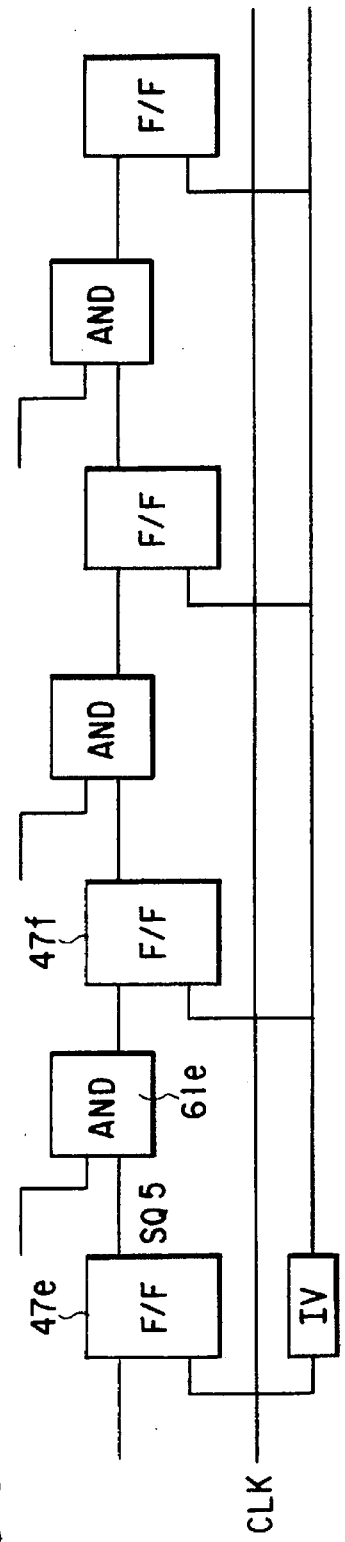
FIG. 13

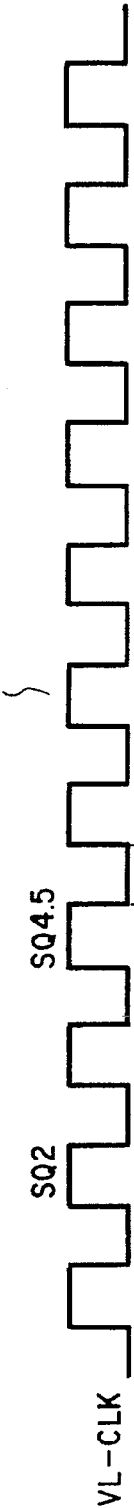
FIG. 14A VL-CLK
FIG. 14B TSJ
FIG. 14C TSWJ
FIG. 14D IORDY
FIG. 14E IORDY (SYNCHRONIZATION)
FIG. 14F COMMAND

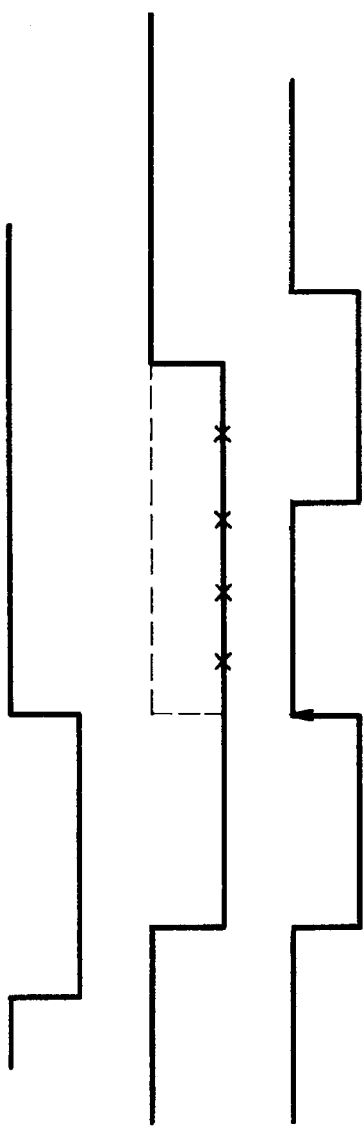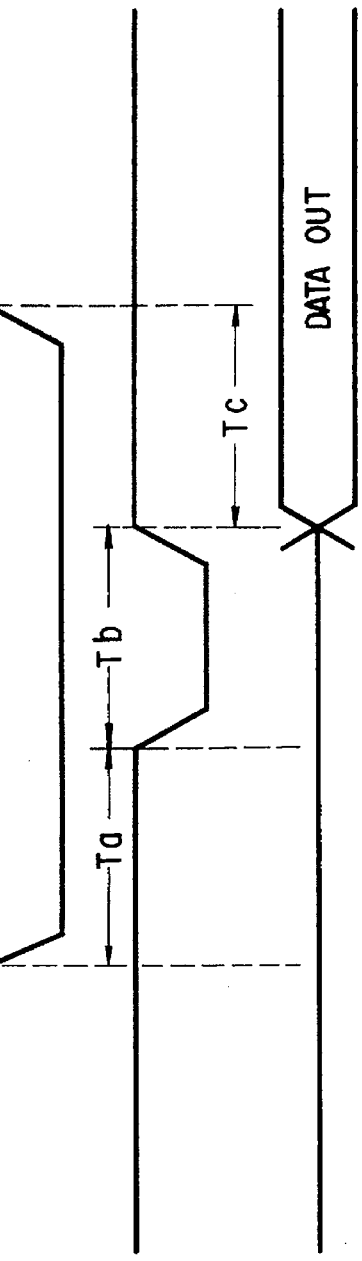

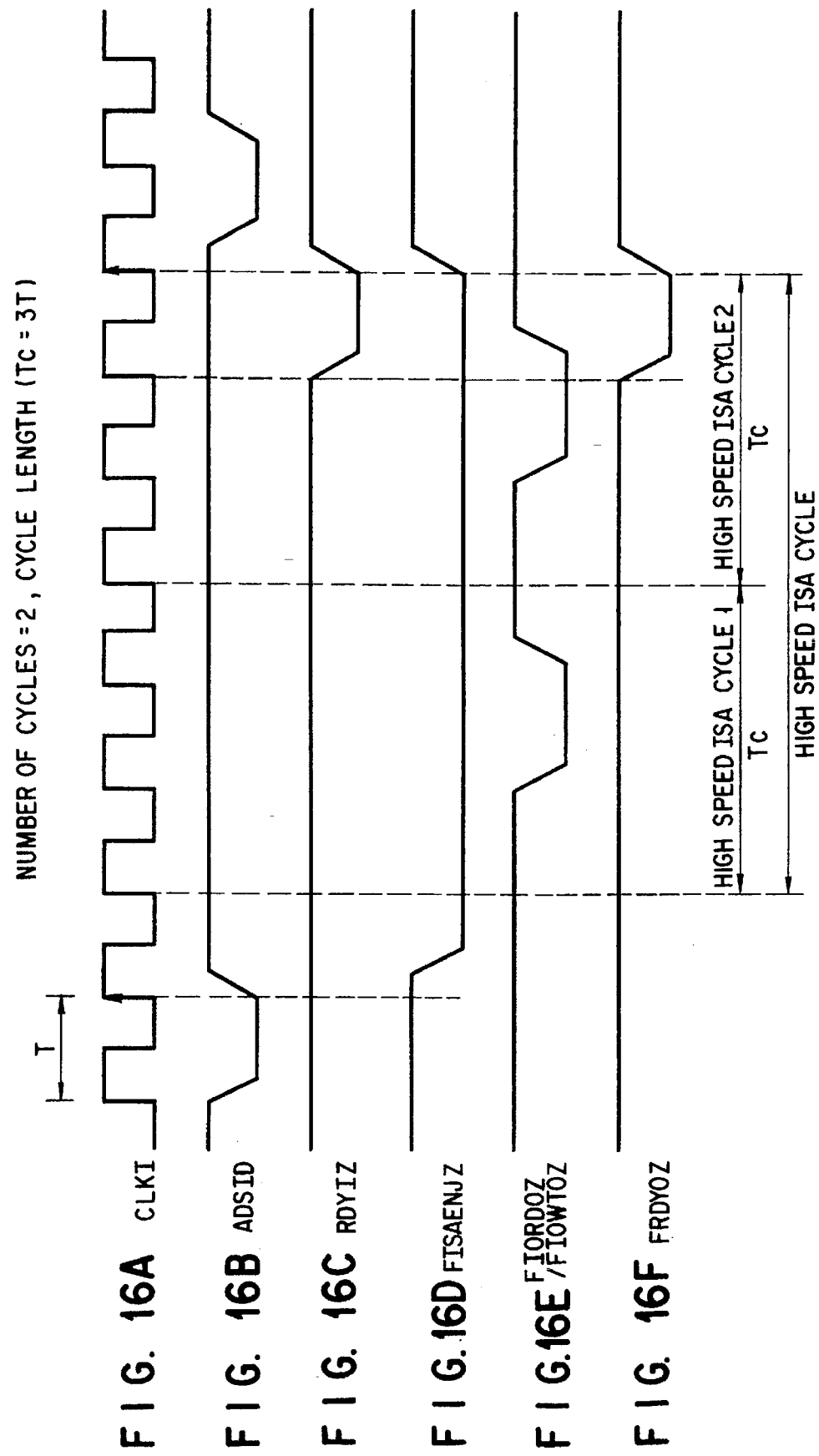

HIGH-SPEED ISA BUS CONTROL SYSTEM FOR CHANGING COMMAND CYCLE EXECUTION SPEED BY SELECTIVELY USING ISA BUS CONTROLLER AND HIGH-SPEED BUS CONTROLLER

BACKGROUND OF THE INVENTION

1. Field of the Invention

This invention relates to a computer system such as a personal computer, and more particularly to an improved computer system so as to access I/O devices in the system at high speeds.

2. Description of the Related Art

Recently, a wide variety of portable personal computers, such as easy-to-carry, battery-powered notebook type or laptop type personal computers, have been developed. In personal computers of this type, ISA (Industry Standard Architecture) buses are generally used.

The ISA buses were originally peripheral extension buses installed in IBM personal computers. Presently, however, they are the most standard extension buses for personal computers. The original ISA buses were used as input/output buses of 5-MHz clock and 8-bit width. Currently, however, they have been improved so as to be used as input/output buses of 8-MHz clock and 16-bit width as well.

The specifications for such ISA buses were determined conforming to the CPU (Intel 8088) employed in IBM PC/XT machines and the CPU (Intel 80286) employed in subsequent IBM PC/AT machines. Therefore, as for the CPUs down to the generation of 80286, ISA buses could be extension buses synchronized with the CPU's internal clock frequency.

For the ISA buses after that, however, to assure compatibility with many extension boards designed to be compatible with the ISA bus, the specifications for ISA buses of those days have been used up to now, without following the trend toward more powerful CPUs.

As noted above, in the past, ISA buses were extension buses synchronized with the CPU's internal clock. At present, however, as the CPU's performance is getting higher and new high-speed buses are appearing on the market, the capability of ISA buses is decreasing relatively.

Specifically, although the performance of CPUs has been getting higher from Intel 80286 to 80386, 80486, and to Pentium, . . . in that order, speeding up the CPU's internal clock and expanding the CPU bus width, the standards for ISA buses have remained unchanged, resulting in an increasing gap in performance between CPUs and ISA buses. As an substitute for ISA buses, EISA (Enhanced Industry Standard Architecture) buses, MCA (Micro Channel Architecture) buses, etc. have been devised, but they have not been widely used. ISA buses are still in use as the standard bus in the industry. One of the buses expected to be the industry standards for the next generation is the PCI (Peripheral Component Interconnect) bus. Even if PCI buses are employed, ISA buses must remain in use for some time.

Furthermore, the peripherals connected to ISA buses include I/O devices with interfaces such as IDE (Integrated Device Electronics), SCSI (Small Computer System Interface), or PCMCIA (Personal Computer Memory Card International Association). The access speeds of these I/O devices determine the performance of personal computer systems.

Consequently, the data transfer speed between the CPU and the I/O devices via a low-speed ISA bus becomes a bottleneck, which therefore limits the performance of the entire system.

SUMMARY OF THE INVENTION

The object of the present invention is to provide a computer system which realizes a higher data transfer speed than the data transfer speed of a bus by making the most effective use of the performance of an I/O device used, and improves the system performance sufficiently without being affected by the bus specifications.

The present invention is characterized in that in a computer system comprising a bus master, a system memory, a system bus to which a plurality of I/O devices are connected, and an I/O controller which executes a bus cycle for controlling the I/O devices on the system bus in response to an I/O access request for the bus master, the I/O controller comprises: address storage means for storing the information indicating an address space in which, among the plurality of I/O devices on the system bus, those that can operate at high speeds are placed; first command cycle execution means for executing a command cycle for issuing a read/write command to I/O devices on the system bus at a first cycle speed; second command cycle execution means for executing a command cycle for issuing a read/write command to I/O devices on the system bus at a second cycle speed faster than the first cycle speed; hit determination means for determining whether or not the value of the I/O address from the bus master belongs to the address space for the I/O devices that can operate at high speeds stored in the address storage means; and command cycle switching means for changing the command cycle execution speed for an I/O device to be accessed by selectively using the first and second command cycle execution means according to the determination result of the hit determination means.

In this computer system, for example, in addition to the first command cycle execution means for executing a command cycle at the first speed complying with the standards for ISA buses, there is provided the second command cycle execution means for executing a command cycle at the second speed faster than the first speed. Among I/O devices to be connected to low-speed buses such as ISA buses, some devices can operate at higher speeds than that of ISA buses. When such a high-speed operable I/O device is specified by an I/O address, the second command cycle execution means is used in place of the first command cycle execution means. Therefore, by making the most effective use of the performance of the I/O device used, it is possible to achieve a higher data transfer speed than the data transfer speed of the bus, and thereby improve the system performance sufficiently without being affected by the bus specifications.

In many present-day personal computers, in particular, IDE interfaces, SCSI interfaces, PCMCIA interfaces, and the like are connected to the ISA buses. Since peripherals, such as HDDs, connected to such interfaces have recently been designed to operate increasingly faster, boosting the speed of data transfer with such peripherals leads to improvements in the performance of the entire system, producing remarkable results.

Furthermore, a computer system of the invention is characterized in that it further comprises command cycle storage means for storing information determining a command cycle execution speed corresponding to the I/O devices that can operate at high speeds, and that the second command cycle execution means is constructed so as to refer to the information stored in the command cycle storage means and execute a command cycle at the command cycle execution speed determined by the information.

With this configuration, it is possible to change the command cycle execution speed arbitrarily in accordance with the contents of the setting information. Accordingly, even if the HDD is replaced with a faster one after a personal computer product containing an I/O controller of the present invention has been shipped, it is possible to make the most effective use of the performance of the HDD by changing the setting information through a driver program or a utility program.

Furthermore, according to the invention, with a high-speed ISA bus cycle in operation, when an inactive IORDY signal indicating that data transfer is not in time is returned from the I/O device side after a read command has been issued to the I/O device, the read command is lengthened. Therefore, the configuration of the invention can cope with the specifications for various I/O devices. Additionally, whether or not the IORDY signal is received on the system side can be decided. When it is received on the system side, whether it is received in synchronization or asynchronization with the clock can be decided. Furthermore, the hold time (Tc) of the IORDY signal can be set up to three clocks in a programmable manner. Therefore, it is possible to select the optimum use environment according to the specifications for the type of I/O device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of the overall configuration of a computer system according to a first embodiment of the present invention;

FIGS. 4A through 4F are timing charts explaining the comparison of a command cycle for high-speed I/O access with a command cycle for low-speed I/O access, both cycles being executed by the I/O control logic of FIG. 2, wherein FIG. 4A shows a VL bus clock signal, FIG. 4B an ISA bus clock signal, FIG. 4C a low-speed command signal, FIG. 4D a low-speed FRDYOZ signal, FIG. 4E a high-speed command signal, and FIG. 4F a high speed FRDYOZ signal;

FIG. 5 is a detailed block diagram of the IORDY command controller of FIG. 2;

FIG. 6 is a circuit diagram of the IORDY synchronizing circuit;

FIGS. 7A through 7F are waveform diagrams at the time when IORDY has been sampled at the leading edge of the clock in the synchronizing circuit of FIG. 6;

FIGS. 8A through 8F are waveform diagrams at the time when IORDY has been sampled at the trailing edge of the clock in the synchronizing circuit of FIG. 6;

FIG. 12A is a waveform diagram of CPU clock, and FIG. 12B is a waveform diagram of an I/O read command and an I/O write command with a setup time of Ts, a pulse width of Tw, and a hold time of Th;

FIG. 13 is a circuit diagram that provides wait control of a command signal;

FIGS. 14A through 14F are timing charts for an example of lengthening a command, FIGS. 15A through 15C are time charts explaining an erroneous operation: FIGS. 15A and 15B show an IORDY signal, and FIG. 15C shows a command signal;

FIGS. 16A through 16F are timing charts indicating the timing of a high-speed ISA cycle when the number of cycles is 2 and the cycle length is Tc=3T; and FIGS. 17A through 17C are waveforms diagram with the timing between command (−IOR/IOW) and IORDY signal explaining ATA-2 standards.

DETAILED DESCRIPTION OF THE PREFERRED EMBODIMENTS

Figure 2:
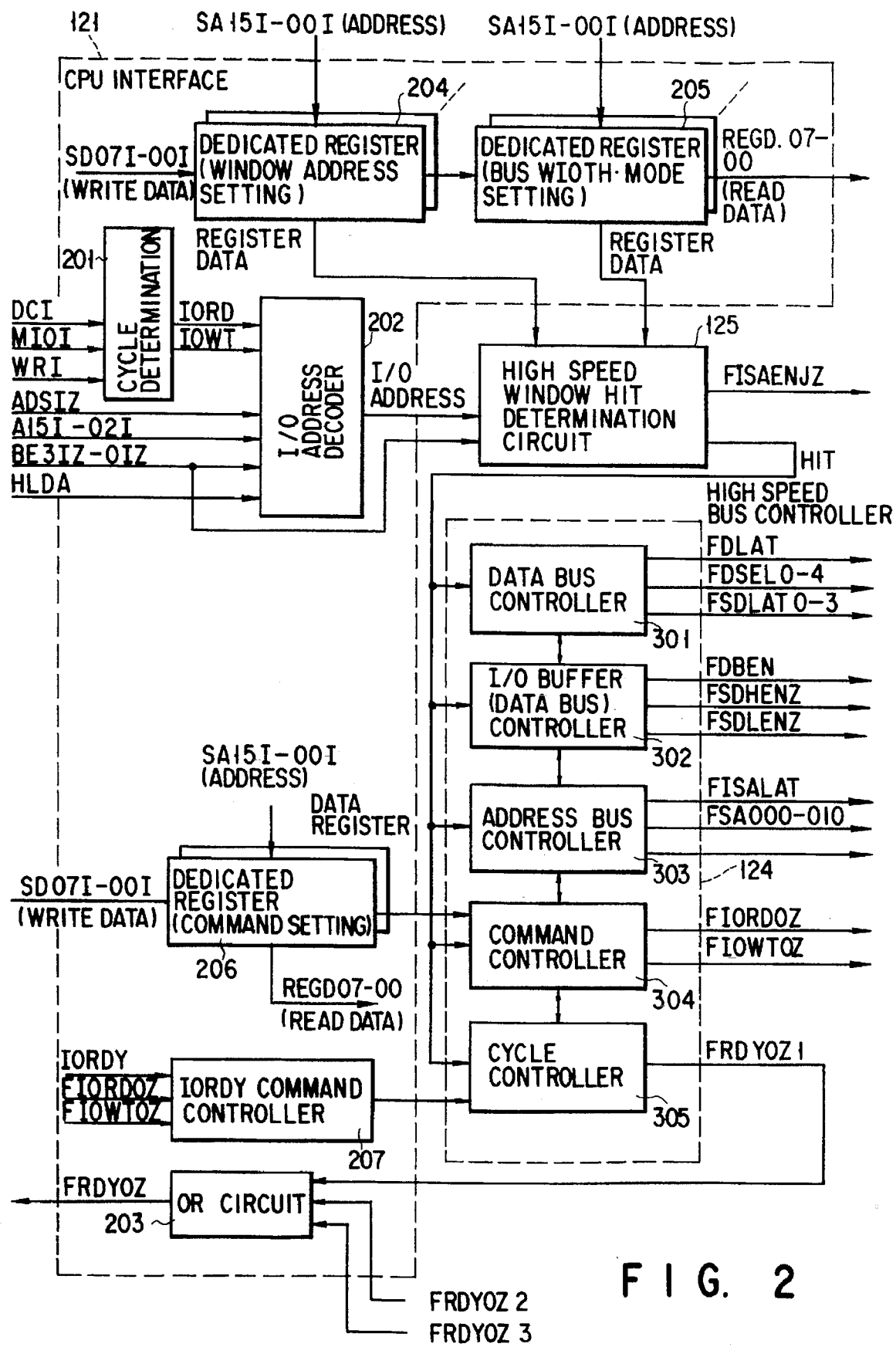
FIG. 2 is a block diagram of I/O control logic provided in the computer system of the first embodiment.
Figure 3:
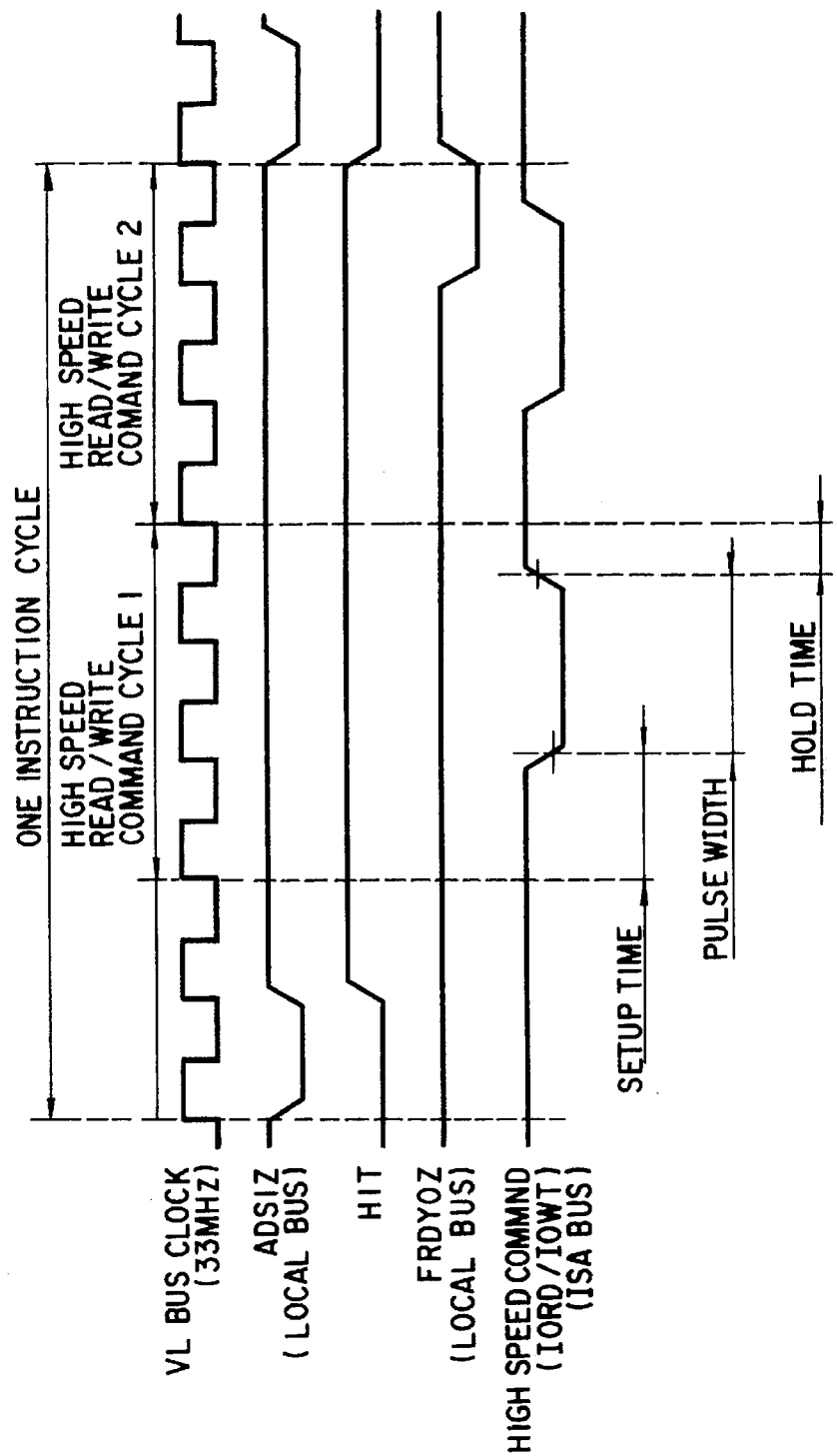
FIGS. 3A through 3E are timing charts explaining the command generating operation for high-speed access to be executed by the I/O control logic of FIG. 2.

Hereinafter, referring to the accompanying drawings, embodiments of the present invention will be explained.

FIG. 1 shows a computer system according to a first embodiment of the present invention. This system is designed to realize a notebook-type or a laptop-type portable personal computer. As shown in the figure, the system comprises a CPU 11, a system controller 12, and a system memory 13. Furthermore, the system is provided with a PCMCIA controller 14, an IDE interface 15, and an SCSI interface 16, which serve as peripheral I/O devices, and other various types of I/O devices 17.

The CPU 11 and system memory 13 are connected to a high-speed local bus 21, such as a processor bus or VL bus for the CPU 11. The PCMCIA controller 14, IDE interface 15, SCSI interface 16, and other I/O devices 17 are connected to an ISA bus 22. The system controller 12 is connected between the local bus 21 and the ISA bus 22.

The CPU 11 is a microprocessor containing a large-scale cache memory, which may be an Intel 80486, for example. The CPU 11 is connected to the system controller 12 via the local bus 21.

The local bus 21 contains a 32-bit data bus, a 32-bit address bus, and various status signal lines. The bus clock of the local bus 21 is 33 MHz, for example.

The system controller 12 controls all of the memories and I/O devices in the system in response to the request of the CPU 11. The system controller 12 is realized using a single LSI composed of a gate array, in which the logic for controlling all of the memories and I/Os in the system is incorporated. The logic for controlling I/Os executes an I/O bus cycle for accessing I/O devices (the PCMIA controller 14, IDE interface 15, SCSI interface 16, and other I/O devices 17) on the ISA bus 22.

In the system memory 13, an operating system, application programs to be executed, and various processing data items are stored. The system memory 13 is a 32-bit memory device composed of a DRAM, whose data input/output terminals are connected to the data bus of the local bus 21 and whose address input terminals and those for various control signals are connected to a memory bus 23. The memory bus 23 is an address bus dedicated for DRAMs. Onto the memory address bus 23, the DRAM's physical addresses (row addresses/column addresses), and DRAM control signals including the row address strobe signal, column address strobe signal, write enable signal, output enable signal, and chip select signal are outputted from the system controller 12.

The ISA bus 22 contains an 8-bit or 16-bit-wide data bus, a 16-bit-wide address, and various status signal lines. The bus clock of the ISA bus 22 is 8 MHz or 16 MHz.

The PCMCIA controller 14, IDE interface 15, and SCSI interface 16 are controllers for controlling peripheral I/O devices such as PC cards or HDDs or I/O devices themselves having these interfaces. For example, in the case of an HDD having an IDE interface, it is connected as the IDE interface 15 directly to the ISA bus 22.

I/O devices connected to the PCMCIA controller 14, IDE interface 15, and SCSI interface 16 have been designed to operate increasing faster, and many of them can operate at higher speeds than the standards for the ISA bus 22. In this embodiment, it is assumed that such I/O devices that can operate at high speeds are connected to the PCMCIA controller 14, IDE interface 15, or SCSI interface 16.

Now, the logic for I/O control provided in the system controller 12 will be described.

The system controller 12, as shown in the figure, comprises a CPU interface 121, a memory controller 122, an ISA bus controller 123, a high-speed bus controller 124, a high-speed window hit determination circuit 125, and a selector 126.

The CPU interface 121 interfaces with the CPU 11 via the local bus 21. The CPU interface 121 is provided with bus cycle discrimination logic. In a memory access cycle, control is passed to the memory controller 122, and in an I/O access cycle, control is passed to the ISA bus controller 123 or the high-speed bus controller 124.

Furthermore, the CPU interface 121 is provided with an I/O register group which can be read from and written into by the CPU 11. Set in the I/O register group is the window address information indicating an I/O address space in which the I/O devices that can operate at high speeds (in this case, the PCMCIA controller 14, IDE interface 15, SCSI interface 16) among those connected to the ISA bus 22, are arranged.

The memory controller 122 provides access control of the system memory 13 in response to the memory access request of the CPU 11. Access control of the system memory 13 is effected by outputting a DRAM physical address and a DRAM control signal onto the memory bus 23.

The ISA bus controller 123, high-speed bus controller 124, high-speed window hit determination circuit 125, and selector 126 constitute the I/O control logic that characterizes the present invention.

The ISA bus controller 123 executes a bus cycle for providing read/write access to I/O devices on the ISA bus 22 in response to the I/O access request of the CPU 11. The bus cycle is executed in the format and at the speed complying with the specifications for ordinary ISA buses. In the bus cycle period, by using the IORD or IOWT signal, a command cycle for issuing a read/write command to the I/O device to be accessed, is executed.

The high-speed bus controller 124, in response to the I/O request of the CPU 11, executes a bus cycle for providing read/write access to the I/O devices that can operate at high speeds on the ISA bus 22. In the bus cycle period, by using the IORD or IOWT signal, a command cycle for issuing a read/write command to the I/O device to be accessed is executed. This command cycle, however, is executed at a higher speed than the cycle speed conforming to the specifications for ordinary ISA buses. The command cycle execution speed is determined by the performance of the I/O device to be accessed.

The high-speed window hit determination circuit 125 determines whether or not the value of the I/O address belongs to the high-speed window (I/O address space) in which the high-speed operable I/O devices are arranged, by decoding the I/O address from the CPU 11 and comparing the I/O address with the window address information. When the I/O address belongs to the high-speed window, or when the I/O address hits the high-speed window, the high-speed window hit determination circuit 125, using the select signal (SELECT), instructs the selector 126 to change the command cycle speed and at the same time, operates the high-speed bus controller 124 by the hit signal (HIT).

The selector 126, in response to the select signal (SELECT), selectively uses the ISA bus controller 123 and high-speed bus controller 124 and thereby changes the speed of the command cycle for causing the I/O device to be accessed to perform a read/write operation.

According to the I/O control logic, when an I/O device that can operate at high speeds has been specified by the I/O address from the CPU 11, a high-speed command cycle is executed by the high-speed bus controller 124 in place of an ordinary command cycle by the ISA bus controller 123. Therefore, by making the most effective use of the performance of the I/O device used, a higher data transfer speed than the data transfer speed of the ISA bus 22 can be realized, and consequently the system performance can be improved sufficiently without being affected by the bus specifications.

Hereinafter, a detailed configuration of the high-speed bus controller 124 and its peripheral logic will be described with reference to FIG. 2.

The CPU interface 121 comprises a cycle determination circuit 201, an I/O address decoder 202, an OR circuit 203, a window address setting register group 204, a bus-width and mode setting register group 205, a command setting register group 206, and an IORDY command controller 207.

The cycle determination circuit 201 monitors the bus cycle determining signals DCI, MIOI, WRI and thereby determines the present bus cycle. In the case of an I/O read cycle, DCI, MIOI, and WRI are "0", "1", and "0", respectively. Furthermore, in the case of an I/O write cycle, DCI, MIOI, and WRI are "0", "1", and "1", respectively. Signals DCI, MIOI, and WRI are negative-logic signals.

If the present bus cycle is an I/O read cycle, the cycle determination circuit 201 will send an IORD signal to the I/O address decoder 202. If the present cycle is an I/O write cycle, the former will send an IOWT signal to the latter.

Receiving an IORD signal or an IOWT signal when an address strobe signal ADSIZ is active, the I/O address decoder 202 decodes the I/O address (address A15I-02I and byte enable signal BE3IZ-0IZ) being outputted at that time on the local bus 21 from the CPU 11. In this case, the I/O address A15I-02I specifies an I/O address in units of 4 bytes and the byte enable signal (BE3-0) indicates which address should be accessed in the 4-byte addresses. The byte enable signal (BE3IZ-0IZ) also indicates which one of 8-bit transfer, 16-bit transfer, 24-bit transfer, and 32-bit transfer the data transfer width is for.

On the basis of the decoding result of the address A151-02I and byte enable signal BE3IZ-0IZ, the I/O address decoder 202 generates an I/O address value actually used to access an I/O device on the ISA bus 22, and supplies it to the high-speed window hit determination section 125.

The OR circuit 203 is used to issue a ready signal FRDYOZ to the CPU 11 via the local bus 21. When any one of the ready signal RDY1 from the high-speed bus controller 124, the ready signal RDY2 from the ISA bus controller 123, and the ready signal RDY3 from the memory controller 122 becomes active, the OR circuit issues an ready signal FRDYOZ to the CPU 11. The ready signal FRDYOZ indicates that the present bus cycle has been completed.

The window address setting register group 204 is made up of 16 8-bit I/O registers that can be read from and written into by the CPU 11. In each of these registers, window address information is set by the CPU 11. Window address information, as noted earlier, indicates the I/O address space in which high-speed operable I/O devices are arranged. Because in this embodiment, four I/O devices (the PCMCIA controller 14, IDE interface 15, and SCSI interface 16 themselves, or the I/O devices connected to them) can operate at high speeds, four pieces of window address information corresponding to these I/O devices are set in the widow address setting register group 204. A piece of window address information is composed of the 16-bit data representing the start address of the I/O address space in which the corresponding I/O device is located and the 16-bit data representing the end address of the I/O address space. Therefore, because a piece of window address information is 32-bit data, it is divided and stored into four 8-bit registers.

The bus-width and mode setting register group 205 is composed of four 8-bit I/O registers that can be read from and written into by the CPU 11. In the four registers of the bus-width and mode setting register group 205, pieces of attribute information (bus-width flag and mode flag) on four high-speed I/O devices are set by the CPU 11. The bus-width flag indicates whether the corresponding I/O device is of an 8-bit device or a 16-bit device. The mode flag indicates that whether the value of the I/O address given to the I/O device must be incremented within the system controller 12, when the corresponding I/O device is accessed consecutively in response to a single I/O access request for the CPU 11.

The command setting register group 206 is composed of four 8-bit I/O registers that can be read from and written into by the CPU 11. In the four registers of the command setting register group 206, pieces of command cycle determining information on each of the four I/O devices that can operate at high speeds are set respectively by the CPU 11. The command cycle determining information indicates the IORD signal supplied to the corresponding I/O device via the ISA bus 22, and the setup time, pulse width, and hold time of the IORD signal. The values of these setup time, pulse width, and hold time are determined by the operating speed of the corresponding I/O device. Therefore, when the PCMCIA controller 14, IDE interface 15, and SCSI interface 16 differ from each other in operation speed, the pieces of command cycle determining information set in the command setting register group 206 each show different values.

By using the window address information in the window address setting register group 204 and the device attribute information in the bus-width and mode setting register group 205, the hit determining operation at the high-speed window hit determination circuit 125 is carried out as follows.

First, the high-speed window hit determination circuit 125 compares the I/O address value from the I/O address decoder 202 with the window address information and thereby determines which window the value of the I/O address belongs to. If it does not belong to any window, the result will be a mishit and an ordinary ISA bus cycle will be executed.

On the other hand, when there is a window to which the value of the I/O address belong, the high-speed window hit determination circuit 125 checks the attribute information corresponding to the I/O device placed in the window to see if the I/O address value after increment exceeds the address range of the window.

For example, when the data transfer width specified by the byte enable signal BE3IZ-0IZ from the CPU 11 is 32 bits and the addressed I/O device is an 8-bit device, an I/O cycle for 8-bit data transfer will be executed four times consecutively. In this case, if the addressed I/O device is a device that requires address increment, the value of the I/O address must be incremented by +1 four times in all. Therefore, in this case, a check is made to see if each of the 10 address values incremented exceeds the address range of the corresponding window. If the address value exceeds the range, it will be determined to be a mishit, forbidding the use of the high-speed bus controller 124 and allowing the use of the ISA bus controller 123. If the address value does not exceed the range, the high-speed bus controller 124 will be used. For example, when data may be transferred at high speeds and the parameter setting commands for HDDs must be operated at low speeds, depending on the types of I/O devices (e.g., HDDs), 8-bit access to the window's boundary-value address is determined to be data transfer and a high-speed transfer is carried out, whereas 16-bit access to the boundary-value address is determined to be command transfer because it exceeds the range of the window, and a low-speed transfer is carried out.

The purpose of forbidding the use of the high-speed bus controller 124 when the incremented address value exceeds the address range of the corresponding window, is to prevent an erroneous operation resulting from a low-speed I/O device being accessed in a high-speed command cycle or an erroneous operation resulting from a high-speed I/O device being accessed at the command cycle speed corresponding to another high-speed I/O device.

When the I/O device is a device that does not require address increment, or when the data transfer width is the same as the bus width of the I/O device, the result is determined to be a hit unconditionally.

The high-speed bus controller 124, as shown in the figure, is composed of a data bus controller 301, an I/O buffer controller 302, an address bus controller 303, a command controller 304, and a cycle controller 305, which operate in response to the hit signal HIT from the high-speed window hit determination circuit 125.

On the basis of the discrimination in the CPU cycle and the decode and window hit determination of the I/O address, the high-speed bus controller 124 determines that the present cycle is a high-speed ISA cycle and then outputs an FISAENJ signal shown in FIG. 16D. This prevents the CPU interface 121 from generating an ISA cycle and switches the selector for each of the output signals FIORDOZ, FIOWTOZ, SA010, SA000, SBHEOZ, DLAT, DSEL0-4, SDLAT0-3, and ISALAT to the high-speed bus controller 124. These signals are low fixed outputs when FISAENJ=L (low level). The high-speed bus controller 124, when the FDISJZ input becomes active, judges that a device (such as a VGA controller) on the VL bus has been selected, and does not go into the high-speed ISA mode. The completion of the high-speed ISA cycle is conveyed to the CPU interface by the FRDYOZ signal. At this time, the FISAENJZ signal switches the output signals including SBHEOZ to the CPU interface. FIGS. 16A through 16F are timing charts for clock signals CLKI↑, ADSIZ, RDYIZ, FISAENJZ, FIORDOZ/ FIOWTOZ, and FRDYOZ, respectively, when the number of cycles is 2 and the length of cycle is Tc=3T.

The conditions for FISAENJZ=L are as follows:

1) HLDA=L, MIOI=L, DCI=L, and BEOZ=L must be met

2) When (ADSIZ+MIOI)=L, CLKI is given

3) The address decode result must hit the high-speed ISA window

4) FDISJZ=H must be met

FISAENJZ goes back H (high) with CLKI↑ when RDYIZ=L.

The data bus control circuit 301, I/O buffer controller 202, and address bus controller 303 generate control signals for the inside of the system controller 12 to control the data bus and address bus of the ISA bus 22. These control signals are used for, for example, control of data output timing, specification of byte lane, and byte enable specification in the case of the data bus, and for control of address output timing in the case of the address bus.

By using the I/O read signal IORD or I/O write signal IOWT outputted on the ISA bus 22, the command controller 304 executes a command cycle for causing the addressed high-speed I/O device to perform a read/write operation. In this case, the execution speed of the command cycle is determined by the command cycle determining information (setup time, pulse width, and hold time) corresponding to the addressed high-speed I/O device.

The cycle controller 305 generates a ready signal FRDY-OZI when the read/write cycle for the high-speed I/O device has been completed.

The IORDY command controller 207 is a circuit for lengthening the cycle width of the I/O read/write command in a case where the I/O device side has outputted a NOT READY (inactive IORDY signal) meaning that data transfer is not in time at the time when a high-speed bus cycle was driven. A detailed explanation of this will be given later.

The various signals outputted from the data bus controller 301, I/O buffer controller 302, address bus controller 303, command controller 304, and cycle controller 305 will be listed below.

| Name of signal | Function |
| --- | --- |
| FDLAT | Data latch signal of D31I-00I, Transparent latch. Latch at "H" |
| FDSEL4-0 | Signal for data swap |
| FSDLAT3-0 | ISA data latch signal |
| FDBEN | Output enable signal of D31-00. External pin D31-00, one of the bidirectional buffer output enable conditions. ORed with DBEN signal from CPU control block and DOE signal from DRAM control block. |
| FSDHENZ | Output enable signal of SD15-08. External pin SD15-08, one of the bidirectional buffer output enable conditions. ORed with SDHENZ signal from CPU control block. |
| FSDLENZ | Output enable signal of SD07-00. External pin SD07-00, one of the bidirectional buffer output enable conditions. ORed with SDLENZ signal from CPU control block. |
| FISALAT | Signal for latching CPU address for output to ISA address |
| FSA000-010 | ISA address 00 output and ISA address 01 output |
| FIORDOZ | IORD for high-speed ISA |
| FIOWTOZ | IOWT for high-speed ISA |
| FRDYOZ | High-speed ISA cycle ready signal. ORed in negative logic with RDYOZ output of DRAM control block and inputted to RDYOZ of CPU control block |

Referring to the timing chart of FIGS. 3A through 3E, the command generating operation for high-speed I/O access will be explained.

Explained here will be a case where the local bus 21 is a VESAVL bus and a read/write command is generated using the bus clock (33 MHz) of the VL bus.

First, the CPU 11 executes an I/O access instruction to start a bus cycle for I/O access, thereby making the address strobe signal ADSIZ on the local bus 21 active, and at the same time, outputs bus cycle determination signals DCI, MIOI, WRI, and an I/O address onto the local bus 21.

During the period of an address phase when ADSIZ is kept active, the I/O address from the CPU 11 is decoded by the I/O address decoder 202, and a hit determination is made at the high-speed window hit determination circuit 125.

When a hit is made, a hit signal HIT of a 1 is sent from the high-speed window hit determination circuit 125 to the high-speed bus controller 121. In response to the hit signal HIT, the high-speed bus controller 121 starts high-speed bus cycle control. The command control circuit 304 refers to the command setting register group 206 and senses the command cycle determining information corresponding to the addressed high-speed I/O device. Then, the command controller 304 issues an I/O read signal IORD or I/O write signal IOWT onto the ISA bus 22 according to the setup time, pulse width, and hold time determined by the command cycle determining information.

The high-speed I/O device performs a read or write operation in response to the command. The read or write operation completes without fail during the command cycle period defined by the setup time, pulse width, and hold time. The reason for this is that the setup time, pulse width, and hold time that are used are determined to the performance of the I/O device to be accessed. Therefore, the higher the performance of the I/O device, the shorter the execution period of the command cycle can be made.

If the data transfer width requested by the CPU 11 is 32 bits and the I/O device to be accessed is a 16-bit device, for example, a command cycle will be executed twice consecutively.

The setup time, pulse width, and hold time for the second command cycle are the same as those of the first command cycle.

At the end of the second command cycle, the cycle controller 305 outputs a ready signal FRDYOZ1, which causes FRDYOZ indicating the completion of the bus cycle to be issued to the CPU 11.

As described above, when an I/O device that can operate at high speeds is addressed, a command cycle is executed at high speeds to make the most effective use of the performance of the I/O device. The bus cycle for accessing an I/O device that can operate at high speeds is the same as the ordinary ISA cycle except the command cycle.

Figure 4:
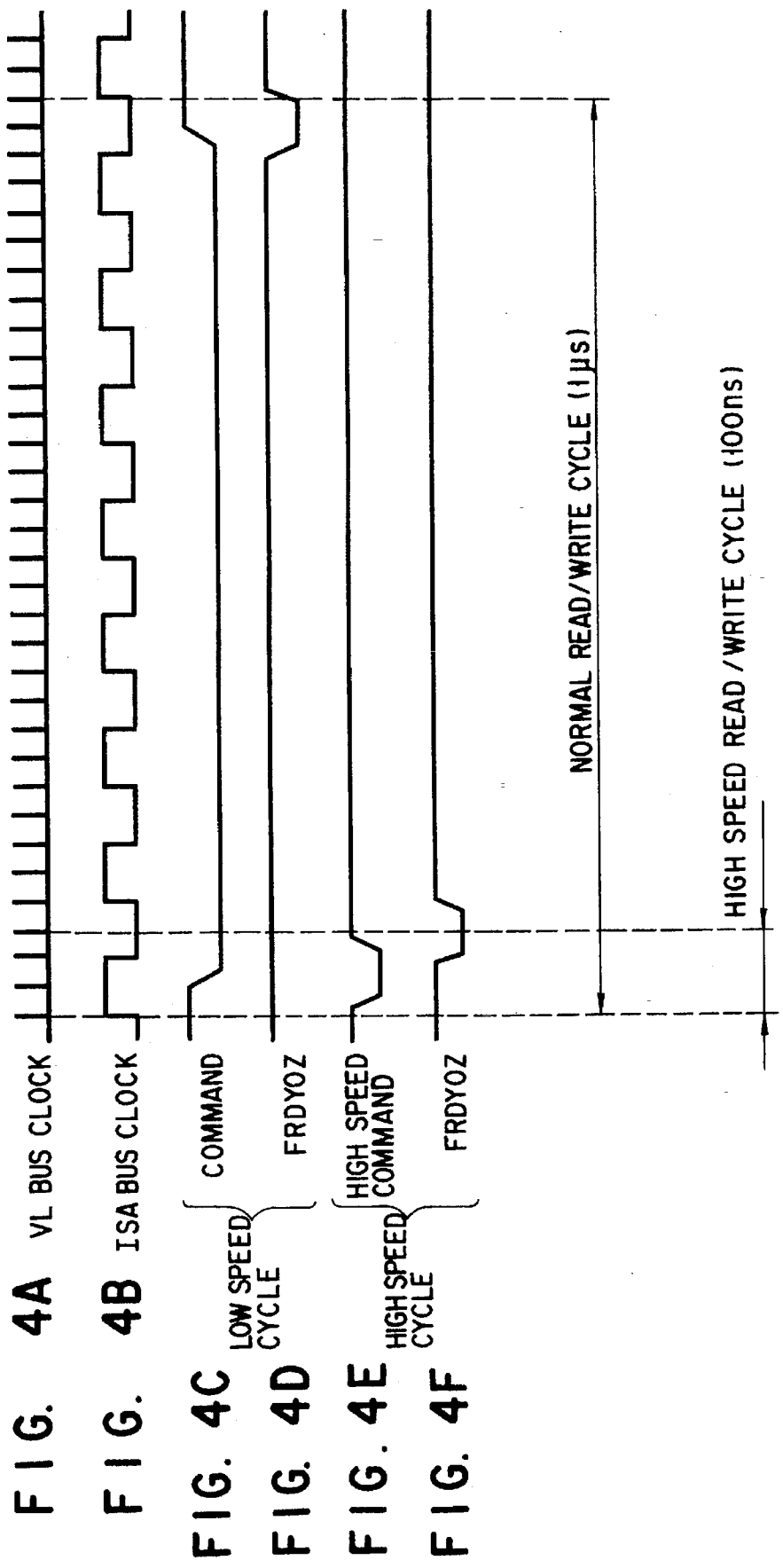

In FIG. 4, a high-speed bus cycle when the high-speed window has been hit is compared with a low-speed bus cycle in the case of mishit.

In the case of mishit, that is, when an ordinary I/O device is addressed, the execution of a single command cycle requires about 1 μs. On the other hand, in the case of hit, that is, when a high-speed operable /O device is addressed, a single command cycle can be completed in, for example, about 100 to 200 ns, by making the best use of the high-speed operable I/O device.

The IORDY command controller 207 shown in FIG. 2 is composed of an IORDY mode switching register 31, an IORDY synchronizing circuit 33, and a malfunction protection circuit 35 as shown in FIG. 5. An IORDY signal (an inactive IORDY signal indicating a busy state) is outputted from the HDD side in a case where data transfer is not in time when a read command has been issued to an I/O device (e.g., a hard disk drive). When the IORDY signal has arrived, the cycle of the read command must be prolonged. For example, the timing for a high-speed IDE interface (U.S. Adaptec AIC-35VL01) with mode 6 setting (the maximum transfer rate: 20 MB/sec) is as follows:

| | |
|---|---|
| Tc: Cycle Time | 180 ns (min.) |
| Ts: Address Setup time to IORD/IOWT | 20 ns (min.) |
| Tw: IORD/IOWT Pulse Width (16/8-bit) | 80 ns (min.) |
| Tr: IORD/IOWT Recovery Time | 25 ns (min.) |

At this time, when data transfer is not in time because of the high-speed ISA cycle, the HDD outputs an IORDY signal. In response to this, the system side must prolong the read command.

The IORDY mode switching register 31 is a register for setting the IORDY mode. Each bit assignment is set as follows:

bit 7: IORDY mode enable bit 6: IORDY sample mode (IORDY synchronizing mode enable)

bit 5: IORDY malfunction protection circuit bit 4 to bit 2: N/C bit 1, 0: the setting of the number of additional clocks from IORDY↑ to command↑

The settings and functions of bit 7, bit 6, and bit 5 are as follows:

| bit | Setting | Function |
|---|---|---|
| bit 7 | 1 | Receive IORDY |
| | 0 | Does not receive IORDY |
| bit 6 | 1 | IORDY synchronized mode |
| | 0 | IORDY asynchronized mode |
| bit 5 | 1 | IORDY malfunction protection circuit enable |
| | 0 | IORDY malfunction protection circuit enable |

Explained next will be the IORDY synchronizing circuit 33.

As shown in FIGS. 17A and 17B, it takes 35 ns (ATA-2 standard) (time Ta) from the time when command (_IOR/IOW) goes low until an IORDY signal is outputted. When the command is programmable, this means that it operates with the clock. Therefore, the command synchronizes with the clock, but the IORDY comes in asynchronously. With a short command setting, when the IORDY is sampled, sampling with the clock can result in a delay in time. Therefore, to cause the asynchronously arriving IORDY signal to keep up with the synchronized signals, it must be synchronized with the clock.

FIG. 6 is a detailed circuit diagram of the IORDY synchronizing circuit. In FIG. 6, a flip-flop (F/F) 37 latches the IORDY signal in synchronization with the leading edge of the clock signal CLK shown in FIG. 7A. At the same time, the clock signal CLK is inverted by an inverter and inputted to an F/F 41. Because of this, the F/F 41 latches the IORDY signal in response to the trailing edge of the clock signal CLK. An OR circuit 43 ORs the output A from the F/F 37 (see FIG. 7D) with the output B from the F/F 41 (see FIG. 7E). The output signal from the OR circuit 43 is latched into an F/F 45 in synchronization with the leading edge of the clock CLK. As a result, as shown in FIG. 7F, an IORDY signal synchronizing with the clock signal CLK is obtained from the F/F 45.

In a mode where sampling is done synchronously as described above, the IORDY signal cannot be sampled unless it lasts for at least one clock. For this reason, in this embodiment, there are provided two modes: a synchronous sampling sampling mode and an asynchronous sampling mode. In the synchronous mode, if IORDY does not arrive 1.5 clocks before sampling, it will not be sampled properly. In the asynchronous mode, if IORDY arrives 0.5 before sampling, it can be sampled properly. For this reason, in this embodiment, as described above, the IORDY mode switching register 31 is provided with a bit (bit 6) for switching between the synchronous mode and the asynchronous mode.

The waveforms in FIGS. 7A through 7F show the case where IORDY has been sampled at the leading edge of the clock CLK. To make IORDY effective with the timings shown in FIGS. 7A through 7F, IORDY must be inputted 2.0 T+α (T is the clock period) before the completion of the command.

The waveforms in FIGS. 8A through 8F show the case where IORDY has been sampled at the trailing edge of the clock CLK. To make IORDY effective with the timings shown in FIGS. 8A through 8F, IORDY must be inputted 1.5 T+α before the completion of the command. When IORDY is synchronized as shown in FIGS. 7A through 7F and FIGS. 8A through 8F, to prolong the command, IORDY must be inputted 2.0 T+α before the termination of the command. Then, when the pulse width (Tw) of the command is set at 2.0 or less, IORDY cannot be made effective. Thus, apart from the synchronous mode, there is provided an asynchronous mode where SQ and SS are masked, while IORDY is used as it is. In the case of the asynchronous mode, if IORDY has arrived by 0.5 T+α before the completion of the command, the command can be prolonged. The rear edge of the inputted IORDY is formed in both of the synchronous and asynchronous modes so as to rise after it has been latched into the F/F once. The purpose of this is to secure the time (Tc) from when IORDY has disappeared until a command starts to rise, when IORDY has become effective.

Hereinafter, the command generating circuit will be described in detail.

Figure 9:
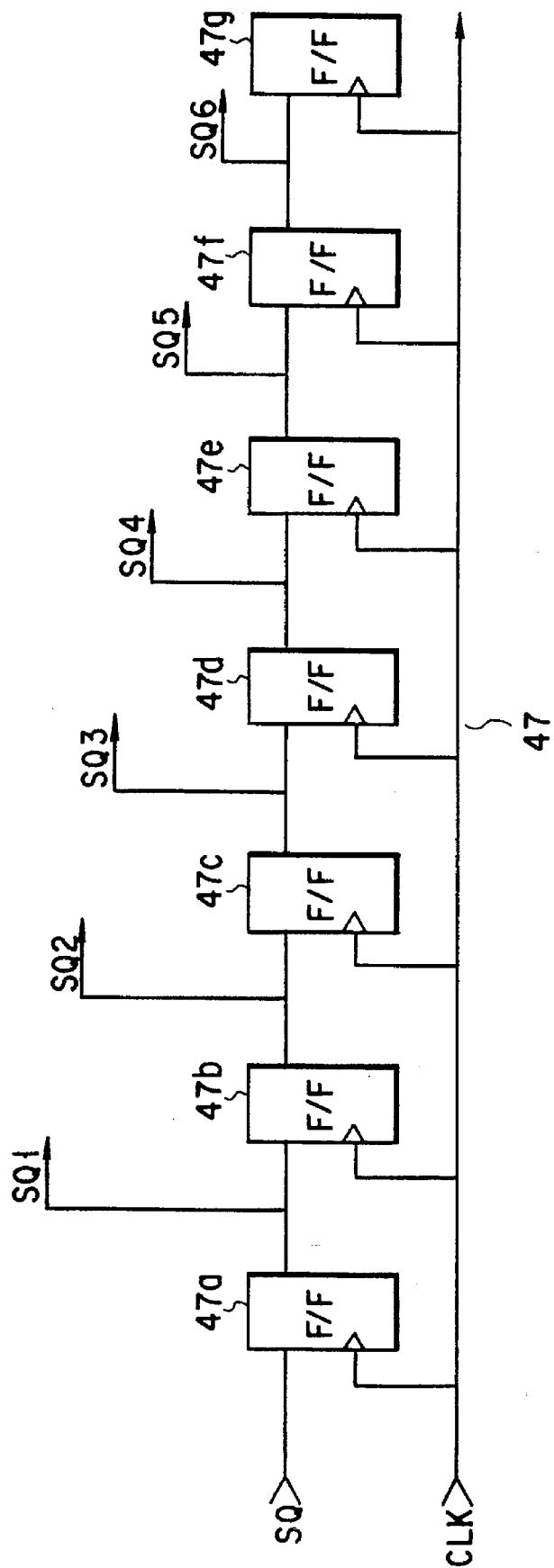
FIG. 9 is a detailed circuit diagram of the command generating circuit.
Figure 10:
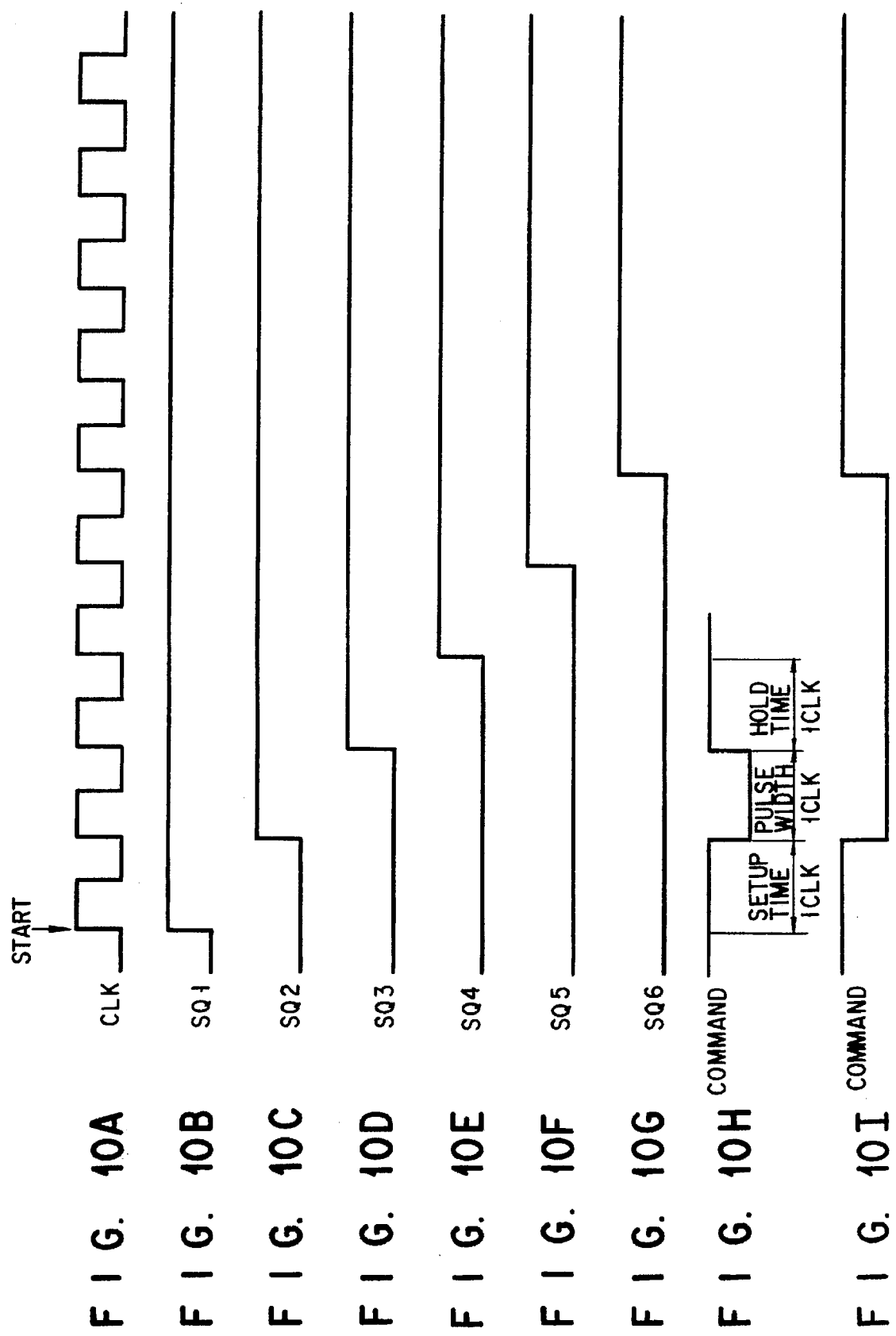
FIGS. 10A through 10G are waveform diagrams of the clock signal CLK, and the SQ signals SQ1 to SQ6.
FIG. 10H is a waveform diagram of a command signal with a clock of setup time, a clock of pulse width, and a clock of hold time.
FIG. 10I is a waveform diagram of a prolonged command signal.
Figure 11:
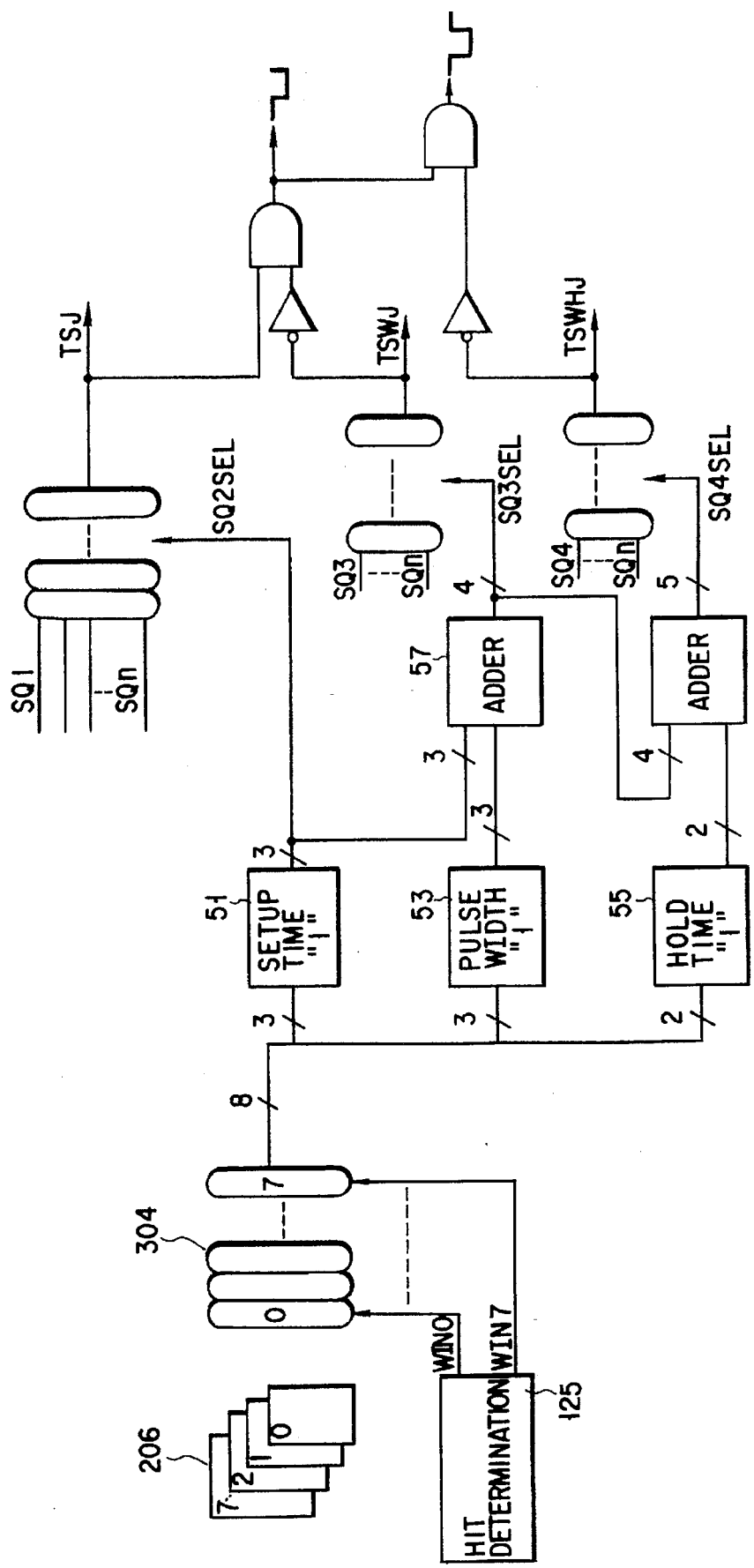
FIG. 11 is a detailed circuit diagram of the command controller 304 and cycle controller 305 shown in FIG. 2.

FIG. 9 is a detailed circuit diagram of the command generating circuit. As shown in FIG. 9, the command generating circuit contains a shift register 47 composed of a plurality of flip-flops (F/Fs) 47a, 47b, 47c, 47d, 47e, 47f, 47g, . . . . The individual F/Fs 47a, 47b, 47c, 47d, 47e, 47f output SQ signals SQ1, SQ2, SQ3, SQ4, SQ5, SQ6, each delayed one clock from the preceding one. The waveforms for the clock signal CLK and SQ signals SQ1, SQ2, SQ3, SQ4, SQ5, SQ6 are shown in FIGS. 10A through 10G, respectively. As noted above, the command setting register group 206 is composed of four 8-bit I/O registers. In the individual registers, pieces of command cycle determining information on four I/O devices that can operate at high speeds are set respectively by the CPU 11. The command cycle determining information contains the setup time, pulse width, and hold time of the IORD signal. A command controller 304 contains a setup time register 51, a pulse width register 53, and a hold time register 55 as shown in FIG. 11, which holds the setup time, pulse width, and hold time from the command setting register 206, respectively. For the sake of explanation, it is assumed that a command with a clock of setup time, a clock of pulse width, and a clock of hold time is generated. Furthermore, the point indicated by an arrow in FIG. 10A is assumed to be the starting position. In this case, a parameter of "1" is set in each of registers 51, 53, 55. As a result, the register 51 outputs such a signal as to select the value obtained by adding 1 to the start, that is, signal SQ2SEL signal for selecting signal SQ2. The output signal from register 51 is supplied to an adder 57. The adder 57 adds the signal from register 53 to the signal from register 51, and outputs such a signal SQ3SEL as to select signal SQ3. The signal from register 57 is supplied to an adder 59. The adder 59 adds the output signal from the register 57 to the output signal from the register 55, and outputs signal SQ4SEL for selecting signal SQ4. As a result, signal SQ2 serves the beginning of the command and SQ3 serves the end of the command. Therefore, a signal obtained by adding signal SQ2 to the inverse of signal SQ3 is a command. Finally, signal SQ4 indicates the end of the cycle, and another signal is generated.

The contents of the settings in the high-speed ISA window command pulse setting register are as follows. If the clock period is T, an nT/2-times setup time, pulse width, and hold time will be given. Here, cases where 30 MHz and 33 MHz were used as CPU clock are shown.

| bit 7-5: Setup Time (Ts) | | | |
|---|---|---|---|
| bit 7 6 5 | nT/2 | 30MHz (T = 33ns) | 33MHz (T = 30ns) |
| 000 | 0.5T | 17ns | 15ns |
| 001 | 1.0T | 33ns | 30ns |
| 010 | 1.5T | 50ns | 45ns |
| 011 | 2.0T | 66ns | 60ns |
| 100 | 2.5T | 83ns | 75ns |
| 101 | 3.0T | 100ns | 90ns |
| 110 | 3.5T | 116ns | 105ns |
| 111 | 4.0T | 132ns | 120ns |

| bit 4-2:Pulse Width (Tw) | | | |
|---|---|---|---|
| bit 4 3 2 | nT/2 | 30MHz (T = 33ns) | 33MHz (T = 30ns) |
| 000 | 1.5T | 50ns | 45ns |
| 001 | 2.0T | 66ns | 60ns |
| 010 | 2.5T | 83ns | 75ns |
| 011 | 3.0T | 100ns | 90ns |
| 100 | 3.5T | 116ns | 105ns |
| 101 | 4.0T | 132ns | 120ns |
| 110 | 4.5T | 149ns | 135ns |
| 111 | 5.0T | 165ns | 150ns |

| bit 1-0 Holt Time (Th) | | | |
|---|---|---|---|
| bit 1 0 | nT/2 | 30MHz (T = 33ns) | 33MHz (T = 30ns) |
| 00 | 0.5T | 17ns | 15ns |
| 01 | 1.0T | 33ns | 30ns |
| 10 | 1.5T | 50ns | 45ns |
| 11 | 2.0T | 66ns | 60ns |

By setting this register, the setup time (Ts), pulse width (Tw), and hold time (Th) of each of I/O read command and I/O write command with respect to CPU clock can be set as shown in FIGS. 12A an 12B.

Furthermore, the relationship between the 3-bit output from the register 51 of FIG. 11 and the setup time Ts and signal name (TSJ) (see FIG. 11) is as follows:

| P8FOX | | |
|---|---|---|
| D7J D6J D5J | Ts | Signal name (TSJ) |
| 000 | 0.5T | SQ2P5J |
| 001 | 1.0T | SQ3J |
| 010 | 1.5T | SQ3P5J |
| 011 | 2.0T | SQ4J |
| 100 | 2.5T | SQ4P5J |
| 101 | 3.0T | SQ5J |
| 110 | 3.5T | SQ5P5J |
| 111 | 4.0T | SQ6J |

P8FOXD7J-D5J are the values of Bit 7-Bit 5 of the currently hitting index among Port-8FH (Index=00H-07H). Ts is the setup time (the distance from SQ2) given by its register value. From these values, TSJ is selected.

The relationship between the 4-bit output from the adder 57 of FIG. 11, setup time+pulse width, and signal name is as follows:

| TSW | | |
|---|---|---|
| D3J D2J D1J D0J | Ts + Tw | Signal name (TSWJ) |
| 0000 | 2.0T | SQ4J |
| 0001 | 2.5T | SQ4P5J |
| 0010 | 3.0T | SQ5J |
| 0011 | 3.5T | SQ5P5J |
| 0100 | 4.0T | SQ6J |
| 0101 | 4.5T | SQ6P5J |
| 0110 | 5.0T | SQ7J |
| 0111 | 5.5T | SQ7P5J |
| 1000 | 6.0T | SQ8J |
| 1001 | 6.5T | SQ8P5J |
| 1010 | 7.0T | SQ9J |
| 1011 | 7.5T | SQ9P5J |
| 1100 | 8.0T | SQ10J |
| 1101 | 8.5T | SQ10P5J |
| 1110 | 9.0T | SQ11J |

TSWD3J-D0 is the value obtained by adding Bit7-Bit5 (Ts) to Bit4-Bit2 (Tw) of the currently hitting index among Port-8FH (Index=00H-07H). Ts+Tw is setup time+pulse width (the distance from SQ2) given by TSWD3J-D0J. From these values, TSWJ (see FIG. 11) is selected.

The relationship between the 5-bit output from the adder 59 of FIG. 11, setup time+pulse width+hold time, and signal name is as follows:

| TSWH | | |
|---|---|---|
| D4J D3J D2J D1J D0j | Ts + Tw + Th | Signal name (TSWHJ) |
| 00000 | 2.5T | SQ3P5J |
| 00001 | 3.0T | SQ4J |
| 00010 | 3.5T | SQ4P5J |
| 00011 | 4.0T | SQ5J |
| 00100 | 4.5T | SQ5P5J |
| 00101 | 5.0T | SQ6J |
| 00110 | 5.5T | SQ6P5J |
| 00111 | 6.0T | SQ7J |
| 01000 | 6.5T | SQ7P5J |
| 01001 | 7.0T | SQ8J |
| 01010 | 7.5T | SQ8P5J |
| 01011 | 8.0T | SQ9J |
| 01100 | 8.5T | SQ9P5J |
| 01101 | 9.0T | SQ10J |

-continued

| | TSWH | |
|---|---|---|
| D4J D3J D2J D1J D0j | Ts + Tw + Th | Signal name (TSWHJ) |
| 01110 | 9.5T | SQ10P5J |
| 01111 | 10.0T | SQ11J |
| 10000 | 10.5T | SQ11P5J |
| 10001 | 11.0T | SQ12J |

TSWHD4J-D0 is the value obtained by adding Bit7-Bit5 (Ts) and Bit4-Bit2 (Tw) and Bit1-Bit0 (Th) of the currently hitting index among Port-8FH (Index=00H-07H). Ts+Tw+Th is high-speed ISA cycle time (=setup time+pulse width+hold time=the distance from SQ2) given by TSWHD4J-D0J. From these values, TSWHJ (see FIG. 11) is selected. TSWHJ is sampled from the signal 1T before the end of the cycle and is used for the generation of FRDYOZ signal. For example, when (Ts+Tw+Th)=2.5 T, although the cycle starting at SQ2 ends at SQ4P5J, TSWHJ is sampled from SQ3P5J and then FRDYOZ starts to be generated.

Explained next will be weight control of the command signal.

It is assumed that as shown in FIG. 10I, the cycle width of the command is equal to the distance from SQ2 to SQ6. To cause the command signal to wait when the IORDY signal has been inputted in this state, the command signal should be prevented from being counted up in the presence of signal SQ6. In other words, in FIG. 9, signal SQ5 should be masked with the IORDY signal in order not to be latched into F/F 47*f*. That is, as shown in FIG. 13, by inputting the IORDY signal to an AND gate 61*e* connected to the output stage of the F/F 47*e*, signal SQ5 is blocked by the AND gate 61*e*, as long as the IORDY signal is low, and is not latched into the F/F 47*f*. As a result, the command signal does not change from the low to the high level until signal SQ6 goes high, and consequently the command signal is forced to wait.

FIGS. 14A through 14F are timing charts showing the way in which the command is prolonged with the following timings, when 2 T of IORDY is inputted in the synchronous mode with Ts=0.5, Tw=2.5, and Th=0.5.

In this embodiment, the time from IORDY↑ to command ↑ can be changed arbitrarily up to three clocks by register setting. Namely, the time (hold time: Tc) from when IORDY has risen until the command has risen can be changed to the specifications of the type of HDD.

The relationship between the setting register and additional clocks is as follows:

| bit 0 | bit 1 | Function |
|---|---|---|
| 0 | 0 | No. of additional clocks = 0 |
| 0 | 1 | No. of additional clocks = 1 |
| 1 | 0 | No. of additional clocks = 2 |
| 1 | 1 | No. of additional clocks = 3 |

The IORDY command controller 207 contains eight windows and operates according to the window in which data is set (only when an enabled one of the eight windows has been accessed, all of the bits in the IORDY mode switching register become effective).

The malfunction protection will now be described.

In a case where although IORDY has been outputted in the IORDY mode, TSWJ has failed to be prolonged (in a case where IORDY has not been sampled by 0.5 T before the end of the command), SQ that has risen to generate a command can be caused to go low. To prevent such an erroneous operation, there is provided a circuit that, when IORDY is ineffective in prolonging the command, clears the internal IORDY (the IORDY in the circuit that actually prolongs the command) even if IORDY is at a low level. This circuit is enabled by setting bit 5 of the IORDY mode switching register 31. If the IORDY signal inputted to the AND gate is still active even in the next cycle, an erroneous operation can take place. From the viewpoint of internal signal, in a case where the command is prolonged when IORDY signal has been inputted as shown in FIG. 15A, the low level of IORDY signal is prolonged as shown in FIG. 15B. At this time, if IORDY signal remains low as shown in FIG. 15B, although the command signal has changed from the low level to the high level as shown in FIG. 15C, this has an effect on the next cycle. Therefore, to prevent an erroneous operation, IORDY signal is set at the high level, not at the low level, as shown by the broken line of IORD signal in FIG. 15B, thereby preventing the next cycle from being affected. The erroneous operation preventive function is provided for simulation. For example, to determine the position where IORDY cannot be sampled in simulation, IORDY signal can be placed purposely in a position that would be unlikely in a normal condition. In this case, since an expected operation will occur, the function is used to prevent such an operation. Therefore, in an actual operation, such an erroneous operation never takes place. When in an actual operation, the signal is inputted with the timing that does not allow IORDY to be sampled, this means that an erroneous operation has occurred already, and that such setting should not be done. If this has happened, the cycle width of the command signal must be set wider. Such being the case, an erroneous operation never takes place in an actual operation.

Normally, this problem can be avoided by the following two methods without using the circuit.

1) Widening the command width

Since the time from command ↓ to IORDY ↓ in the specification of IORDY is a maximum of 35 ns, widening the pulse width eliminates a case where IORDY cannot be sampled.

2) Operating in the asynchronous mode

IORDY is passed through so as to be in time to 0.5 T before the leading edge of the command.

As mentioned above, in this embodiment, in addition to the ISA bus controller 123 that executes a command cycle at a normal speed, there is provided the high-speed bus controller 124 that executes a command cycle at a higher speed. Depending on an I/O device to be accessed, they are used selectively.

Therefore, it is possible to make the most effective use of the performance of the I/O device used and achieve data transfer higher in speed than the data transfer of the ISA bus 22.

Furthermore, according to the contents of the setting of the command cycle determining information, the command cycle execution speed can be changed arbitrarily. Therefore, even if the HDD is replaced with a faster one, after a personal computer product containing the system controller 12 of this embodiment has been shipped, it is possible to make the most effective use of the performance of the HDD by changing the contents of the setting of the command setting register 206 through a driver program or a utility program.

Because the logic for I/O control provided in the system controller 12 is for making faster the data transfer speed between a device on the high-speed bus and a device on the low-speed bus, it can be applied to a PCI/ISA bridge device that connects a PCI bus to an ISA bus in a similar way.

In this embodiment, the present invention has been applied to the data transfer between the CPU 11 and an I/O device on the ISA bus 22. The invention is not restricted to the CPU 11, and may be applied to the data transfer between a device functioning as a bus master such as a DMA controller, and an I/O device on the ISA bus 22 in a similar manner.

Furthermore, in this embodiment, both of the high-speed operable I/O devices 14 to 16 and the other I/O devices 17 are connected to the IORD and IOWT lines on the ISA bus 22. Special signal lines for a high-speed I/O cycle (hereinafter, referred to as FIORD and FIOWT lines) may be provided in addition to the IORD and IOWT lines, to connect the high-speed operable I/O devices 14 to 16 to the FIORD and FIOWT lines and the other devices 17 to the IORD and IOWT lines on the ISA bus 22 as usual.

By doing this, it is possible to prevent low-speed I/O devices from being affected by quick fluctuations in the input signal, increasing the reliability of the system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system comprising:

a bus master;

a system memory;

a system bus to which a plurality of I/O devices are connected; and an I/O controller which executes, in accordance with at least one predetermined fixed clock signal, a bus cycle for controlling the plurality of I/O devices on said system bus in response to an I/O access request from said bus master, wherein said I/O controller comprises:

address storage means for storing information indicating an address space in which, among the plurality of I/O devices on said system bus, said I/O devices that can operate at high speeds are placed, first command cycle execution means for executing a command cycle that issues a read/write command to the plurality of I/O devices on said system bus at a first cycle speed without changing the at least one predetermined fixed clock signals, second command cycle execution means for executing a command cycle that issues a read/write command to the plurality of I/O devices on said system bus at a second cycle speed faster than said first cycle speed without changing the at least one predetermined fixed clock signal, hit determination means for determining whether or not a value of an I/O address from said bus master belongs to the address space for the I/O devices that can operate at high speeds which is stored in said address storage means, and command cycle switching means for changing the command cycle execution speed for an I/O device to be accessed by selectively using said first and second command cycle execution means according to the determination result of said hit determination means.

2. A computer system according to claim 1, further comprising command cycle storage means for storing information determining a command cycle execution speed corresponding to said I/O devices that can operate at high speeds, wherein said second command cycle execution means refers to the information stored in said command cycle storage means and executes a command cycle at the command cycle execution speed determined by the information.

3. A computer system according to claim 2, wherein said command cycle is executed using an I/O read signal or an I/O write signal defined on said system bus; and the information stored in said command cycle storage means indicates the setup time, pulse width, and hold time of said I/O read signal or I/O write signal.

4. A computer system according to claim 3, further comprising:

first I/O read and I/O write signal lines connected to I/O devices defined on said system bus and other than the devices that can operate at high speeds on said system bus; and second I/O read and I/O write signal lines connected to the I/O devices that can operate at high speeds on said system bus, wherein said first and second command cycle execution means execute a command cycle using said first and second signal lines, respectively.

5. A computer system according to claim 1, further comprising:

first ready signal generating means for, in response to the completion of the command cycle on said first command cycle execution means, issuing to said bus master a ready signal indicating the completion of the bus cycle for I/O access; and second ready signal generating means for, in response to the completion of the command cycle on said second command cycle execution means, issuing to said bus master a ready signal indicating the completion of the bus cycle for I/O access.

6. A computer system according to claim 1, further comprising:

attribute information storage means for storing attribute information as to whether or not said I/O device that can operate at high speeds is a device requiring the value of the I/O address to be incremented when it is accessed consecutively, wherein said hit determination means, when the attribute information stored in said attribute information storage means indicates a device requiring the value of the I/O address to be incremented, determines whether or not the value incremented from the value of the I/O address from said bus master belongs to the address space for the I/O devices that can operate at high speeds stored in said address storage means, and when it does not belong to the address space, forbids the use of said second command cycle execution means.

7. A computer system according to claim 1, wherein said I/O devices that can operate at high speeds are I/O devices connected to said system bus via a PCMCIA interface.

8. A computer system according to claim 1, wherein said I/O devices that can operate at high speeds are I/O devices connected to said system bus via an IDE interface.

9. A computer system according to claim 1, wherein said I/O devices that can operate at high speeds are I/O devices connected to said system bus via an SCSI interface.

10. A computer system according to claim 2, wherein the information stored in said command cycle storage means contains a plurality of parameter values that determine the command cycle execution speeds corresponding respectively to a plurality of I/O devices that can operate at high speeds; and said second command cycle execution means refers to the parameter value corresponding to the I/O device specified by the I/O address from said CPU and executes a command cycle at the command cycle execution speed determined by the parameter value.

11. A computer system comprising:

a first bus driven by at least one first fixed clock signal;

a second bus driven by at least one second fixed clock signal, slower than said at least one first fixed clock signal; and an I/O controller that is provided between said first bus and said second bus and executes a bus cycle that controls an I/O device among a plurality of I/O devices on said second bus in response to an I/O access request from a bus master on said first bus, wherein said I/O controller comprises, storage means for storing address information indicating an address space corresponding to a subset of I/O devices that can operate at high speeds among the plurality of I/O devices on said second bus, and for storing attribute information indicating whether or not the subset of I/O devices that can operate at high speeds are devices requiring an I/O address increment value to be used to increment an I/O address when accessing at least two of the plurality of I/O devices consecutively, first command cycle execution means for executing at a first cycle speed, and without changing said at least one second fixed clock signal a command cycle that issues a read/write command to the I/O device on said second bus, second command cycle execution means for executing at a second cycle speed faster than said first cycle speed and without changing said at least one second fixed clock signal a command cycle that issues a read/write command to the I/O device on said second bus, hit determination means for determining whether or not a value of an I/O address from said bus master belongs to the address space for the subset of I/O devices that can operate at high speeds stored in said storage means, command cycle switching means for changing the command cycle execution speed for an I/O device to be accessed by selectively using said first and second command cycle execution means according to the determination result of said hit determination means, and means for determining whether an I/O address from the bus master, after being incremented by the I/O incremented value stored in said storage means to form an incremented address, is within the address space corresponding to the subset of I/O devices that can operate at high speeds, and forbidding a use of the second command cycle means when the incremented address is not within the address space corresponding to the subset of I/O devices that can operate at high speeds.

12. A computer system according to claim 11, wherein said second command cycle execution means generates a command to be outputted onto said second bus with the timing synchronized with the clock of said first bus, and executes a command cycle using the command.

* * * * *